F. I. JOHNSON.
RESILIENT TIRE FOR VEHICLES.
APPLICATION FILED APR. 25, 1918.

1,287,035.

Patented Dec. 10, 1918.

Inventor
F. I. Johnson
By Attorney
Geo. H. Kennedy Jr.

UNITED STATES PATENT OFFICE.

FREDERIC I. JOHNSON, OF FITCHBURG, MASSACHUSETTS, ASSIGNOR TO JOHNSON PNEU-METAL TIRE COMPANY, OF FITCHBURG, MASSACHUSETTS, A CORPORATION OF MASSACHUSETTS.

RESILIENT TIRE FOR VEHICLES.

1,287,035.  Specification of Letters Patent.  Patented Dec. 10, 1918.

Application filed April 25, 1918. Serial No. 230,707.

*To all whom it may concern:*

Be it known that I, FREDERIC I. JOHNSON, a citizen of the United States, residing at Fitchburg, in the county of Worcester and Commonwealth of Massachusetts, have invented a new and useful Improvement in Resilient Tires for Vehicles, of which the following is a specification accompanied by drawings forming a part of the same.

The object of my invention is to produce a resilient wheel adapted for use on motor trucks and like vehicles, in which the desired degree of resilience may be obtained without the use of pneumatic tires, and I accomplish this object by the construction and arrangement of parts as hereinafter described, the novel features being pointed out in the annexed claims.

Figure 1:
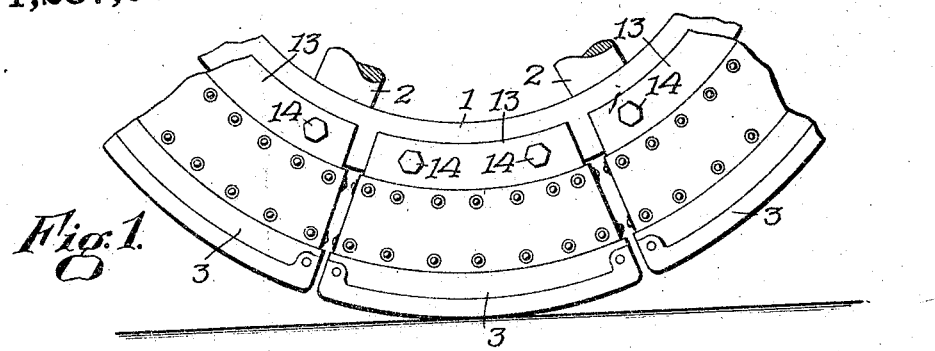

Referring to the accompanying drawings, Figure 1 represents a portion of a vehicle wheel embodying my invention.

Figure 2:
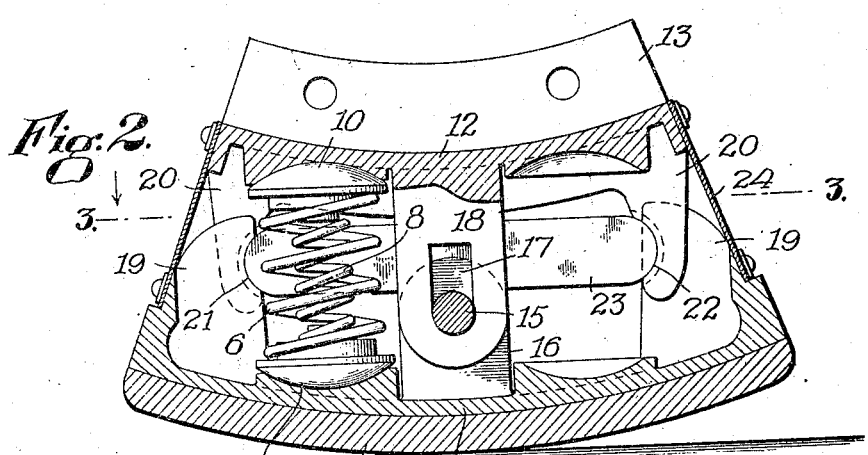
Figure 3:
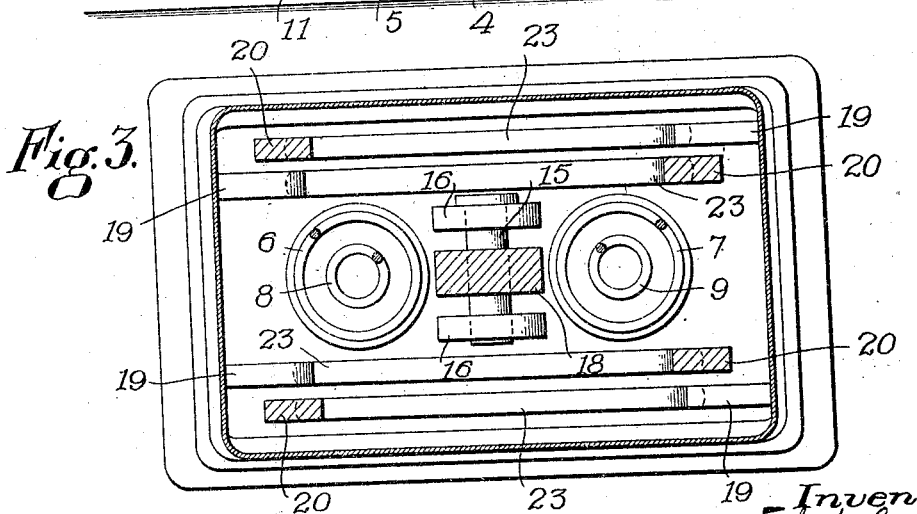

Fig. 2 is a central sectional view of one of the resilient sections forming the tire of the wheel on a plane at right angles to the axis of the wheel, and Fig. 3 is a plan view in section on the plane of the broken line 3—3, Fig. 2.

Similar reference characters refer to similar parts throughout the different figures.

In carrying my invention into practice I secure the desired degree of resilience by interposing springs between the rim of the wheel and a series of treads or shoes arranged concentrically around the rim of the wheel, with open spaces between the sections to permit their freedom of movement as they are being compressed by the weight of the load.

Referring to Fig. 1, 1 denotes the rim of the wheel and 2, 2, spokes upon which the rim is mounted, a sufficient portion of the wheel being shown to illustrate the character of my present invention. Supported upon the rim of the wheel are a series of resilient sections 3. These sections are duplicates of each other, and sectional views of one section, upon a larger scale, are shown in Figs. 2 and 3. These sections comprise a tread plate 4 normally concentric with the axis of the wheel and provided in the present instance with an outer shoe 5 which may be replaced when worn. Between the tread plate 4 and the rim of the wheel coiled springs 6 and 7 are interposed. In Fig. 2 the spring 7 has been removed in order to disclose the construction which would be otherwise hidden. Concentrically held within the springs 6 and 7 are smaller springs 8 and 9. The interposed springs are held in position by means of heads 10 and 11 applied to the ends of the springs and seated in convex recesses in the opposing walls of the resilient section.

For convenience of construction and to facilitate repairs the heads 10 are seated in rim plates 12 having flanges 13 which inclose the sides of the wheel rim and are attached thereto by bolts 14. The outer or tread plate 4 is pivotally connected with the inner or rim plate 12 by means of a bolt 15 held in lugs 16, 16, projecting inwardly from the tread plate 4, said bolt passing through a slot 17 in a lug 18 projecting from the inner or rim plate 12. The slot 17 limits the outward movement of the tread plate 4 under the expansion of the interposed springs and also permits the movement of the tread plate toward the center of the wheel when the interposed springs are compressed by the weight of the load. Integral with the tread plate 4 and extending toward the center of the wheel are lugs 19. These lugs 19, four in number, are arranged at the ends of the resilient tire section 3 and upon opposite sides of its longitudinal center. Integral with and extending outwardly from the rim section 12 are lugs 20 in alinement with lugs 19 and at opposite ends of the tire section. The lugs 19 are provided with concave recesses 21, and the lugs 20 are provided with similar concave recesses 22. Between the opposing edges of the lugs 19 and 20 are thrust bars 23 having rounded ends fitting the concave recesses in the lugs 19 and 20. One end of each thrust bar bears against one of the lugs 19 and its opposite end bears against the lug 20 at the opposite end of the tire section. The rotative movement of either of the opposing members of the tire section about the center of the wheel will be communicated to the other member through the thrust bars 23, and as the rounded ends of the thrust bars are held in the concave recesses 21 and 22 a rocking movement of the tread plate 4 will be permitted about the axis of the bolt 15.

If the load be applied to one end of the tire section, compressing, for example, the springs 6 and 8, while the remaining springs are not compressed, the corresponding end of the tread plate 4 will be moved inwardly carrying the lugs 19 at that end of the section, and causing a swinging movement of the thrust bars 23 which are recessed in said lugs, said bars rocking within the concave recesses of the opposite lugs 20. When no part of the section is under compression the normal position of the thrust bars 23 will be parallel to each other. Flanges are provided on both the tread and rim plates to which I attach a flexible covering 24.

I claim—

1. A resilient tire for vehicles, comprising a rim plate capable of being attached to the rim of the wheel, a tread plate normally concentric with said rim plate, springs interposed between the rim plate and the tread plate, means for limiting the movement of the tread plate radially outward, and means for imparting the rotative movement of the wheel to said tread plate, comprising thrust bars arranged in pairs, with the opposite ends of each thrust bar held in recesses on the rim plate and tread plate respectively.

2. In a resilient tire for vehicles, the combination of a rim plate, a tread plate, yielding means for holding the tread plate away from the rim plate, and means for imparting the rotative movement of the wheel to the tread plate, said means comprising recessed lugs on said rim plate and on said tread plate, and a pair of thrust bars each having one end seated in the recess of a rim plate lug and the opposite end seated in the recess of a tread plate lug.

3. In a resilient tire for vehicle wheels, a rim plate, a tread plate, springs interposed between said rim plate and tread plate, means for limiting the outward movement of the tread plate, and means for imparting the rotative movement of the wheel to the tread plate, comprising a pair of normally parallel thrust bars, having the opposite ends of each bar seated against parts of the rim plate and tread plate respectively and near the ends thereof.

4. In a resilient tire for vehicles, a rim plate having outwardly projecting lugs, a tread plate having inwardly projecting lugs, springs interposed between said plates with the tension of said springs applied to separate said plates, and means for imparting the rotative movement of one of said plates to the other, comprising a pair of thrust bars on each side of the central longitudinal plane of the tread plate, with the opposite ends of said bars engaging the lugs on said rim plate and said tread plate, respectively.

Dated this twenty-second day of April, 1918.

FREDERIC I. JOHNSON.

Witnesses:
 MINNIE BRITTON STODDARD,
 GEO. H. KENNEDY, JR.